Oct. 6, 1936.    MAX-ULRICH BÜCHTING    2,056,769
ELECTRICAL SYSTEM FOR CONTROLLING ANY INDUSTRIAL MEASURING VALUES
Filed June 18, 1934

INVENTOR
MAX-ULRICH BÜCHTING
BY
ATTORNEYS.

Patented Oct. 6, 1936

2,056,769

UNITED STATES PATENT OFFICE 2,056,769

ELECTRICAL SYSTEM FOR CONTROLLING ANY INDUSTRIAL MEASURING VALUES

Max-Ulrich Büchting, Gross-Glienicke, near Berlin, Germany, assignor to Siemens & Halske, Aktiengesellschaft, Siemensstadt, near Berlin, Germany, a corporation of Germany Application June 18, 1934, Serial No. 731,108
In Germany August 22, 1933

8 Claims. (Cl. 236—69)

The invention relates to an electrical system for controlling any industrial measured values, such as a pressure, temperature, humidity, quantity of a liquid or a gas. The new control system responds to variations of the measured value very quickly, but without hunting, and has no electrical contacts. Furthermore very great energies can be controlled by means of the new system without using special gearings or other multiplying means.

These advantages are attained according to the invention by employing the combination of a measuring instrument, a heat-sensitive device and at least one special discharge tube of the type having an inert gas or vapour such as mercury vapour within its envelope, said three means being used to control any organ to be regulated. Preferably the measuring instrument displaces a screen or cover plate, inserted between a blastpipe and a resistance arrangement which is electrically connected to the discharge tubes. It is possible to provide a plate of such a form that a continuous variation of the anode current of the tubes and thereby also a continuous control of the organ to be regulated in dependence upon the pointer deflection will take place. The predetermined dependence of the influence upon the heat-sensitive resistances in response to the deviations of the pointer from its normal position can be adjusted in the new system in a simple way, especially by changing the form of the cover plate or the distance of the heat-sensitive resistances from the plate or finally by the special construction and position of slots for the air passage which are interposed between the cover plate and the heat-sensitive resistances.

Figure 1:
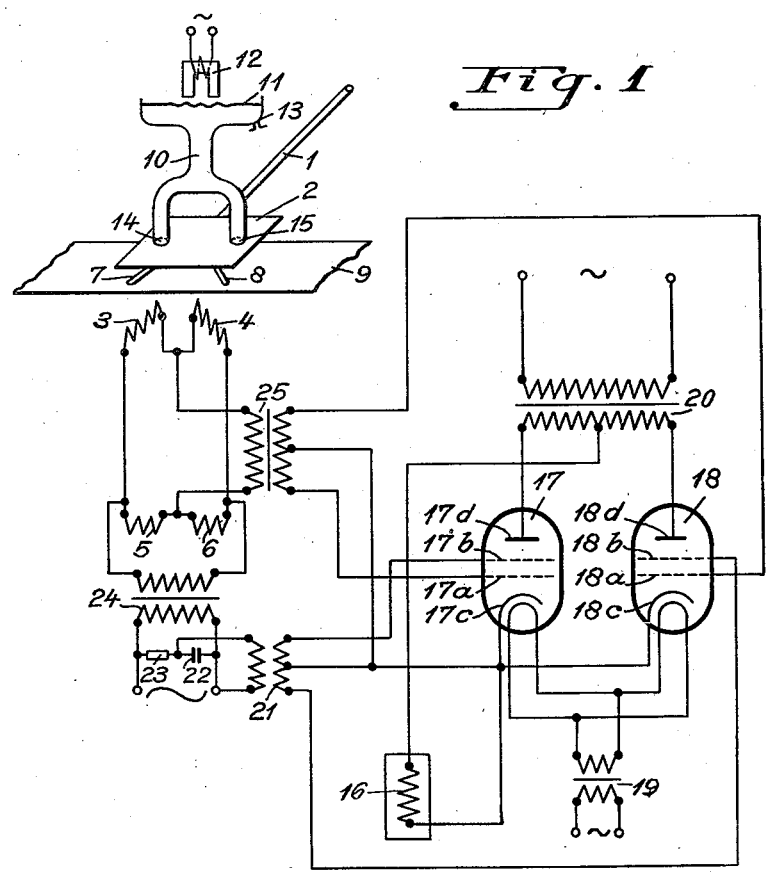
Figure 2:
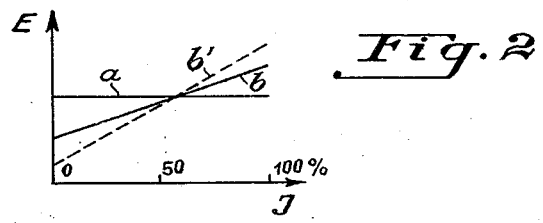

In the drawing, Fig. 1 is a diagrammatic representation of a control system embodying the invention, while Fig. 2 illustrates curves explanatory of the operation of the invention.

To the pointer 1, Fig. 1, of a measuring device—not shown—a temperature measuring instrument for instance, is fixed a small cover plate 2 which, in the example, has the form of a rectangle. The electrical resistances 3 and 4 belong to a heat-sensitive system and are arranged together with two other resistances 5 and 6 in a Wheatstone bridge. Above the resistances 3 and 4 are two slots 7 and 8 provided in a plate 9. A device 10 serves for the production of a continuous air current passing through the slots 7 and 8. The device 10 consists for example of a diaphragm 11 which is caused to vibrate continuously by an electromagnet 12 supplied with alternating current. The diaphragm 11 is enclosed in a casing 13 provided with two blast pipes 14 and 15 the openings of which are placed above the slots 7 and 8. The device 10 produces in the area before the pipes 14 and 15 at some distance therefrom a very strong air current serving to blow upon the heat-sensitive resistances 3 and 4, if the outlets of the pipes are not covered more or less by the small plate 2.

In order to increase the heat-sensitiveness of the arrangement the resistances 5 and 6 can, if desired, be also, made of a resistance material having a high response to temperature changes, as is necessary in any event for the resistances 3 and 4, and all the resistances 3, 4, 5, 6 are in this case placed under the slots 7 and 8 in such a manner that the resistances 3 and 6 lie under the slot 7 and the resistances 4 and 5 lie under the slot 8. Furthermore instead of arranging oblique slots 7 and 8 as is illustrated in the drawing, the slots may be parallel. In this case it is preferred to use a cover plate 2 having the form of an isosceles triangle.

A coil 16 which may be the energizing coil of a magnet or the heating coil of an electrical furnace for instance, is indicated in the drawing as the organ to be regulated. An integrant part of the new system is a discharge tube containing a gas or a vapour (thyratron). In the drawing two discharge tubes 17 and 18 of the said type are represented. They supply more or less electrical energy to the coil 16 to be regulated, if the pointer deflects from its normal position. Each of the two tubes contains a control grid 17a and 18a and a so-called protection grid 17b and 18b. 17c, 18c and 18d, 17d are the cathodes and the anodes respectively of the tubes. The heating circuits of the cathodes 17c and 18c of the tubes are connected indirectly over a heating transformer 19 to a source of alternating current. The anodes 17d and 18d are also connected to a source of alternating current by means of a transformer 20. The organ to be regulated, the coil 16, is connected between the midpoint of the secondary winding of the transformer 20 and the cathodes 17c, 18c.

The protection grids 17b, 18b are connected to a source of an alternating voltage which has a suitable phase displacement, preferably 180°, with respect to all the other alternating voltages. This phase displacement is made in a well known manner by means of an artificial switching connection including a condenser 22 and a resistance 23.

The heat-sensitive Wheatstone bridge 3, 4, 5, 6 is supplied with alternating current over a transformer 24. The current flowing through the resistances 3 and 4 heats them, and the air blasts blown upon said resistances by the device 10 are for the purpose of dissipating such heat and cooling said resistances. This remark will also apply to the resistances 5 and 6 when they are made of a material highly responsive to temperature changes, as referred to above. In the diagonal branch of the bridge is inserted another transformer serving to impress upon the control grids 17a, 18a of the discharge tubes 17, 18 the variations in the amplitude of the alternating current flowing in the diagonal branch of the bridge when the pointer deflects from the normal position shown in the drawing.

The electrical switching connections for the two grid tubes work according to the principle of displacement of the ignition or starting characteristic. This principle is known per se and described in details in the British application 8335/34.

The operation of the system shown in Fig. 1 is as follows:

In the normal position of the pointer 1 the little plate or screen 2 covers equal parts of the slots 7 and 8. Therefore the blast pipes 14, 15 of the device 10 have exactly the same influence on each of the resistances 3, 4. The system is so balanced that in this pointer position the normal energy is flowing in the coil 16. When the pointer 1 deflects from the normal position, towards the left side for instance, that part of the slot 7 which is covered by the plate 2 does not vary in size, but a larger part of the slot 8 is uncovered so that the device 10 now blows upon a larger part of the resistance 4, thereby increasing the cooling of this resistance. The resistance value of 4 therefore changes and causes corresponding variations of the current distribution in the heat-sensitive Wheatstone bridge 3, 4, 5, 6. The difference in amplitude resulting therefrom is impressed upon the grids 17a, 18a and produces a variation of the energy flowing through the coil 16. It is of importance that in the new system without any auxiliary means and in very short time intervals a predetermined variation of the energy in the coil 16 is controlled by a variation of the position of the pointer. The variation of the energy is maintained in the coil 16 until the pointer 1 has gone back to the normal position shown in the drawing. Let us assume that the temperature of an electrical furnace is to be controlled automatically, then the pointer 1 indicates the temperature of the furnace and the coil 16 is the heating winding of the furnace. If in this example the pointer 1 indicates that the temperature of the furnace has decreased, the heat energy of the coil 16, produced by a corresponding control of current amplitudes as above described, will increase. For this reason the pointer 1 is to move back to its normal position after a short time, thereby causing the coil 16 again to get its normal heating energy. It will be understood that the control system works without hunting and that very large energies can be controlled in a very short time after the pointer deflection.

The new system also makes it possible to adjust in a simple way any desired dependence of the variation of the anode current upon the pointer position. Referring now to Fig. 2, the anode current J is represented in percentages as abscissae and the voltage E existing at the ends of the diagonal branch of the Wheatstone bridge as ordinates. The line $a$ which is parallel to the J-axis, represents that desired value of the voltage E which corresponds to the normal position of the pointer 1. The line $b$ gives an example of the relation of the anode current to the pointer deflection. The point of intersection of $a$ and $b$ shows that in the normal position of the pointer 1, Fig. 1, substantially 60 percent of the maximum intensity of the anode current will flow through the coil 16, Fig. 1. Furthermore it will be seen that the total range between 0 percent and 100 percent of the anode current can be controlled by the pointer deflections both towards the left and towards the right, a definite percentage of the anode current corresponding to each position of the pointer. By changing the distance between the slots 7, 8, Fig. 1, and thereby their influences upon the bolometric resistances 3, 4 or by the other means above mentioned, it is possible to obtain another position of the line $b$ and thereby find out the most favorable adaptation of the control with respect to the working conditions. To give an example, if adjustment is made to the characteristic indicated by the broken line $b'$, then a predetermined value of the anode current (different from that at the point of intersection of $a$ and $b'$), the maximum for instance, will flow in the coil 16 only when the deflection of the pointer 1 from its normal position is greater than when the line $b$ is used. It will be clear to those skilled in the art, that in Fig. 2 instead of the variations of the anode current the effect controlled thereby could be the basis of adjustment, such as the variations of heating energy in systems for controlling temperature of electrical furnaces or the degree of opening of a valve in systems for controlling valves in dependence upon pressure.

If desired three or more discharge tubes of the said type can be made use of. It is not necessary that two grids be arranged in the tubes, one grid is sufficient. Furthermore the ignition or starting of the tubes can also be controlled by means other than those described, such as by displacing the phase of the grid voltage when using tubes with a single grid and so on.

Finally the type of the organ 16 to be regulated is not essential. Besides the possibilities above described, the new system can also be employed for controlling the number of motor revolutions and of centrifugal devices driven thereby or for controlling solenoids which adjust any parts, or magnetic valves. Sometimes instead of quick action, it may be desirable to use one operating with a time lag. For this purpose, an additional resistance responding to temperature is provided. Such a resistance, an incandescent lamp for instance, obtains its normal value only after a certain time of working. If an incandescent lamp is used in the system of Fig. 1, it is preferred to connect the same to the diagonal branch of the bridge 3, 4, 5, 6. Then a control temporarily exceeding the right value takes place, because at the beginning of the control a relatively larger influence of the control current upon the ignition characteristic is thereby produced. The type of operation employed will depend substantially upon the special working in each case.

What I claim as my invention and desire to be secured by Letters Patent is:

1. In a control system the combination of a heat-sensitive resistance arrangement, means for heating said resistance arrangement, a measuring instrument, means for changing the resistance value of said arrangement at deflections of the instrument pointer from a predetermined position, at least one discharge tube filled with gas or vapour and having a grid, means for modulating the grid circuit of said tube corresponding to the fluctuations of the resistance value of said arrangement, an organ to be regulated, and means for transmitting differences of the anode current of said tube to said organ.

2. In a control system the combination of heat-sensitive resistances, means for heating said resistances, a blast pipe device for continuously blowing upon said resistances, a measuring instrument, a screen movable between said resistances and said device in accordance with the deflections of the instrument pointer, at least one discharge tube filled with gas or vapour and having a grid, means for modulating the grid circuit of said tube corresponding to the fluctuations of the resistance value of said resistances, an organ to be regulated, and means for transmitting differences of the anode current of said tube to said organ.

3. In a control system the combination of at least two heat-sensitive resistances, means for heating said resistances, a blast pipe device for continuously blowing upon said resistances, a measuring instrument having a pointer, a screen carried by said pointer and interposed between said resistances and said device, a member having two slots for the passage of air, located between the screen and said resistances, at least one discharge tube filled with gas or vapour and having a grid, means for modulating the grid circuit of said tube corresponding to the fluctuations of the resistance value of said resistances an organ to be regulated, and means for transmitting differences of the anode current of said tube to said organ.

4. In a control system the combination of a heat-sensitive Wheatstone bridge, a device for producing a continuous air current, said device being so arranged as to blow upon the heat-sensitive resistances of said bridge, an instrument for measuring any value in an industrial plant and having a pointer, a screen carried by said pointer and projecting into the space between said device and said bridge, a member having two slots for the passage of air, arranged above said bridge, but under the screen so as to mark the normal pointer position, two discharge tubes filled with gas or vapour, each provided with a grid, a transformer for inserting the grid circuit of said tubes in the diagonal branch of said bridge, and an electrical coil connected to the anode circuit of said tubes and adapted to change the value measured with said instrument.

5. In a control system the combination of a heat-sensitive bridge, a device including a diaphragm, an exciting A. C. magnet and blast pipes for producing continuous air flows directed towards said heat-sensitive bridge, a measuring instrument having a pointer, a screen carried by said pointer and interposed between the blast pipes of said device and said bridge, and adapted to change the blowing effect in dependence upon the pointer position, two grid controlled discharge tubes filled with gas or vapour, a transformer having a subdivided secondary winding for connecting the grid circuits of said tubes to the diagonal point of said bridge, an electrical organ to be regulated, and means for connecting said organ to be the anode circuits of said two tubes.

6. A control system according to claim 1 in which a temperature meter is provided as the measuring instrument and a heating coil as the organ to be regulated.

7. A control system according to claim 3 in which two discharge tubes filled with gas or vapour, each having a control grid and a protection grid, are provided and in which the protection grids are connected to phase displacing means.

8. A control system according to claim 4 in which an additional resistance dependent upon temperature and time, an incandescent lamp for instance, is connected to the anode circuit of said discharge tubes.

MAX-ULRICH BÜCHTING.

CERTIFICATE OF CORRECTION.

Patent No. 2,056,769. October 6, 1936.

MAX-ULRICH BUCHTING.

It is hereby certified that error appears in the printed specification of the above numbered patent requiring correction as follows: Page 3, second column, line 28, claim 5, strike out the word "be"; and that the said Letters Patent should be read with this correction therein that the same may conform to the record of the case in the Patent Office.

Signed and sealed this 15th day of December, A. D. 1936.

(Seal)

Henry Van Arsdale
Acting Commissioner of Patents.